Patented Aug. 7, 1945

2,381,487

UNITED STATES PATENT OFFICE 2,381,487

FORMATION OF FIRE-RETARDANT AND WATER-REPELLENT FINISHES

Alton A. Cook, Glen Ridge, and Ernest B. Whitworth, Hillside, N. J., assignors to Arkansas Company, Inc., Newark, N. J., a corporation of New York No Drawing. Application March 26, 1942, Serial No. 436,336

6 Claims. (Cl. 106—15)

This invention relates to the treatment of fabrics, paper, pasteboard, yarns, and other fibrous or highly porous combustible materials or articles to render them fire-retardant and water-repellent. The invention involves improvements in the methods and compositions employed and in the resultant products.

It is well known that fabrics or analogous fibrous materials or articles may be rendered fire-retardant by treatment with borax solutions, and it is also well known that such materials or articles may be rendered water-repellent, by treating them with suitable liquids, such for instance as a bath containing a combination of paraffin wax, aluminum compounds and emulsifying agents such as gelatin.

Certain problems have been encountered in efforts to make materials both fire-retardant and water-repellent. Many of the compounds used in fire-retardant baths, such for instance as borax, phosphates and ammonium salts will break the emulsion of the water-repellent bath, or otherwise seriously reduce the water-repellent properties which would otherwise have been effected. This occurs by a chemical or physical action which may take place in the bath if the two liquids are brought together before use, or may occur on the surface of the article to be treated if the liquids are used in succession. If the water-repellent material is applied first and thoroughly dried before applying the fire-retardant material, the latter is not absorbed satisfactorily by the material or article being treated.

One important feature of our invention is the provision of suitable means whereby the breaking of the emulsion of water-repellent materials is prevented when contacting with the fire-retardant materials. In carrying out our invention we employ as an essential ingredient, a water-soluble, aliphatic, carboxylic acid having at least one hydroxyl group or a mixture of such acids. By using such an acid or acids it is possible to treat the fabric or other material, first with the fire-retardant material and then with the water-repellent material, without danger of breaking the emulsion or otherwise destroying the effectiveness of the latter, or the two compositions may be used in a single bath and applied simultaneously. If separate baths are used, the acid is employed in the bath with the borate.

In the preferred procedure for carrying out our invention, we form a fire-retardant composition of a borate and a water-soluble, aliphatic, carboxylic acid having at least one hydroxyl group, and preferably also employ an ammonium salt, although if the borate be an ammonium borate, the addition of a separate ammonium salt is usually not necessary.

As an example of acids containing hydroxy groups, we may use any one of the following:

| | |
|---|---|
| Glycolic | Tartaric |
| Lactic | Citric |
| Tartronic | Gluconic |
| Malic | |

Another function of these acids, in addition to the stabilizing of the fire-retardant composition against aluminum or other metallic salts present in the water-repellent compound, is to increase the solubility of the alkali borate, thus allowing the preparation of highly concentrated products not possible without them. The exact mechanism of this action is obscure, but it may be due to the formation of a complex reaction product between the aliphatic carboxylic acid and the borate radical.

A solution is made up of one or more of these acids and a borate which is preferably an alkali one and may be sodium borate, potassium borate, ammonium borate, or other soluble borate. If the borate employed is not an ammonium borate, it is preferable to use a third ingredient, which may be an ammonium salt such as a:

| | |
|---|---|
| Chloride | Lactate |
| Sulfate | Bicarbonate |
| Cyanate | Carbonate |
| Thiocyanate | Borate |
| Acetate | | of ammonia.

A mixture of the two or preferably three ingredients may be manufactured and sold as a liquid, a semi-liquid or paste, or a granular solid. All of the ingredients and the mixtures of them are highly soluble in water at ordinary temperatures. The concentration or total solids of the liquid or semi-liquid compound as sold may vary from 50 to 75%. For treating a fabric or other material or article, the concentrated solution of the composition may be diluted to a 10% to 15% solution and the fabric immersed therein. Thereby effective fire resistance is imparted to it, and if an ammonium compound be employed, the liability of residual sparks in the fabric after the latter has been subjected to flame, is reduced to a minimum.

Although the ingredients may be used in varying proportions, the ratio of anhydrous alkali borate to anhydrous aliphatic, carboxylic acid is preferably 5 parts of the former to 1 to 3 parts of the latter. The ratio by weight of anhydrous alkali borate to the ammonium salt may be about 5 parts of the former to 5 to 10 parts of the latter.

The following are examples of our improved fire-retardant composition:

Example 1

1,000 pounds borax dissolved in a mixture of 350 pounds of 50% lactic acid and 200 pounds of water at 90° C. and mixed until completely dissolved. Then 850 pounds of ammonium thiocyanate are added directly to this solution with continued stirring. The resulting product is an amber liquid, which is stable under all ordinary conditions.

Example 2

700 pounds of ammonium borate are dissolved in a mixture of 250 pounds of glycolic acid (70%) and 300 pounds of water at 90° C. as previously. (In this case no additional ammonium salt is used.)

Example 3

1,000 pounds of borax are dissolved in 600 pounds of 50% gluconic acid and 200 pounds of water. The procedure is essentially the same as described above, and after the borax is completely dissolved, 600 pounds of ammonium acetate are added to the mixture.

Example 4

700 pounds of potassium borate are dissolved in a mixture of 350 pounds of 70% glycolic acid and 150 pounds of water. Then 400 pounds of ammonium thiocyanate and 400 pounds of ammonium chloride are added. This product is of a semi-solid consistency.

Example 5

1,000 pounds of borax are dissolved in a solution consisting of 200 pounds of tartaric acid in 700 pounds of water. 500 pounds of ammonium sulfate are added to this solution.

Example 6

1,000 pounds of borax, 170 pounds of citric acid, 330 pounds of ammonium chloride. This product is a granular powder which is prepared simply by mixing the three ingredients together.

Although the compositions above referred to may be employed for rendering materials or articles fire-retardant, even though there is no need or desire for rendering them water-repellent, the presence of the water-soluble aliphatic acid is of particular importance where it is desired to also render the product water-repellent. The presence of one or more of the above mentioned aliphatic carboxylic acids also imparts to fabrics a relatively soft finish as distinguished from the rather harsh finish usually resulting from the use of borates and other inorganic salts as fire-retardants.

In rendering a fabric both fire-retardant and water-repellent, it may be treated in various ways, among which are the following:

Example 7

Any of the above compositions are made up in a bath approximately 1 pound to the gallon, and the goods are run slowly through at 110° to 120° F. in such a way as to get thorough impregnation. To the same bath is then added a sufficient quantity of a water-repellent composition consisting of an emulsion of paraffin wax with aluminum formate and gelatin, previously dissolved or emulsified in hot water, if necessary, so that the actual concentration of the water-repellent in the bath is of the order of 5 to 8%. The goods are then run through the combination bath and dried in the usual manner. The goods thus treated have both good fire-retardant and water-repellent properties.

Example 8

A combination bath of the fire-retardant composition and the water-repellent composition is made up within the following range of composition:

| | Per cent |
|---|---|
| A solution containing an alkali borate | 4 to 6 |
| An aliphatic carboxylic acid having at least one hydroxyl group | 1 to 3 |
| An ammonium salt | 5 to 8 |
| A hydrocarbon wax | 0.5 to 2 |
| A soluble aluminum compound in sufficient amount to given an Al$_2$O$_3$ content of | 0.1 to 0.5 |
| Gelatin | 0.1 to 0.5 |

The goods are simply passed through this combination once and then dried in the usual manner.

In other cases it may be necessary to pass the goods through two separate baths, in order to produce a higher degree of water-repellency. An example of this is as follows:

Example 9

The first bath consists of 10 to 12% of the fire-retardant and approximately 5% of a water-repellent composition. The goods are run slowly through the above to get as thorough impregnation as possible, and then squeezed as dry as possible. The second bath consists of the fire-retardant 6 to 8% and the water-repellent in the order of 8 to 10%. The goods are run through this second bath and then dried in the usual manner.

Example 10

A solution is made of the fire-retardant in the strength indicated above, together with a small percent of a high titre soap in the bath. For this purpose a modified fire-retardant composition may be made up as follows:

1,000 lbs. of borax are dissolved in 600 lbs. of 50% gluconic acid, as described in the previous examples. Then 800 lbs. of ammonium thiocyanate are added. To this mixture is added a partially saponified stearic acid soap made up as follows:

| | Pounds |
|---|---|
| Stearic acid | 180 |
| Caustic soda | 16 |
| Water | 400 |

The fabric is run through this bath and squeezed as dry as possible and then run into a second bath consisting of 8 to 10% of the fire-retardant and 4 to 6% of an aluminum compound, such as a formate or acetate, said aluminum compound to contain 8 to 10% Al$_2$O$_3$. As a result the aluminum compound reacts with the soap to form a water-repellent compound.

Any of the compositions described in Examples 1 to 8 inclusive may be used as fire-retardants alone or they may be used as in Examples 7 to 10 to impart both fire-retardant and water-repellent properties. The invention may be employed in the treatment of all types of textile fabrics of woven or other form, or of yarns, loose fibers, pressed fiber compositions, paper and other products of cellulosic or other fibrous compositions which are of a combustible nature.

In the treatment of fabrics and some other products, it is important that the finished product be porous; that is, it may breathe, this being particularly important in fabrics used for making uniforms or other garments. The drying of the water-repellent composition on the fabric, when applied either with or after the fire-retardant composition, does not close up the pores as is the case with many water-repellent materials such as pyroxylin, chlorinated rubber, etc. The fire-retardant composition is compatible with the usual type of one-bath water-repellents and we do not claim any novelty in such water-repellent baths per se. The fire-retardant composition is also compatible with soaps and also with solutions of aluminum compounds such as aluminum formate, acetate, and the like.

Although, as above noted, any number of a large number of water-soluble aliphatic carboxylic acids may be employed, it is not desirable in some cases to employ an acid which will impart an odor, and therefore in such cases, acids such as propionic, butyric, and the like are not suitable. It is preferable that an acid of the type having one or more hydroxyl groups be used, because when used with a water repellent material the resulting bath is more stable. In applying the fire-retardant and water-repellent compositions, the highest degree of water-repellency is obtained where the material is treated in two separate baths, for instance, as in Examples 9 and 10.

The composition used in making the water-repellent bath may be manufactured and sold either as a rather concentrated liquid or a paste, or where the aliphatic acid is normally a solid, the composition may be as a granular powder. When the composition is to be used, it may be diluted to the desired extent; for instance, as indicated in Example 7.

Having thus described our invention, what we claim as new and desire to secure by Letters Patent is:

1. A stable bath for rendering fibrous material fire-retardant and water-repellent, which includes a water solution of alkali borate, a water-soluble aliphatic carboxylic acid having at least one hydroxyl group, and an emulsion of a water-repellent composition.

2. A porous sheet of cellulosic material having applied thereto a solution of on alkali borate and a water-soluble aliphatic carboxylic acid having at least one hydroxyl group to render the same non-inflammable, and also having applied thereto an emulsion of a water-repellent material, said solution and emulsion being applied simultaneously.

3. A porous sheet of cellulosic material having applied thereto a solution of an alkali borate and a water-soluble aliphatic carboxylic acid having at least one hydroxyl group to render the same non-inflammable, and also having applied thereto an emulsion of a water-repellent material, said solution and emulsion being applied in succession in the order named.

4. A porous sheet containing a fire-retardant composition composed essentially of an alkali borate, a water-soluble aliphatic carboxylic acid having at least one hydroxyl group, and having on its surface a waterproofing composition including paraffin wax and an aluminum compound and an emulsifying agent.

5. A bath for use in rendering articles fire-retardant and water-repellent, which is composed essentially of:

| | Per cent |
|---|---|
| An alkali borate | 4 to 6 |
| A water-soluble aliphatic carboxylic acid having at least one hydroxyl group | 1 to 3 |
| An aluminum salt | 5 to 8 |
| A hydrocarbon wax | 0.5 to 2 |
| A soluble aluminum compound in sufficient amount to give an $Al_2O_3$ content of | 0.1 to 0.5 |
| Gelatin | 0.1 to 0.5 |
| Water | Balance |

6. A bath for use in rendering articles fire-retardant and water-repellent, which is composed essentially of:

| | Per cent |
|---|---|
| Borax | 3 to 5 |
| Gluconic acid (50% strength) | 1 to 2 |
| Ammonium thiocyanate | 3 to 5 |
| Stearic acid soap | 0.5 to 1 |
| Water | Balance |

ALTON A. COOK.
ERNEST B. WHITWORTH.